(12) United States Patent
Yamasaki et al.

(10) Patent No.: US 6,661,956 B2
(45) Date of Patent: Dec. 9, 2003

(54) OPTICAL FIBER CABLE FOR USE IN A DISPERSION MANAGED CABLE SYSTEM

(75) Inventors: Dean Yamasaki, Newton, NC (US); Jeffrey S. Hendrick, Hickory, NC (US); Steven P. Colby, Hudson, NC (US); Jeffrey T. Moore, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 09/902,239

(22) Filed: Jul. 10, 2001

(65) Prior Publication Data

US 2003/0012530 A1 Jan. 16, 2003

(51) Int. Cl.[7] ................................. G02B 6/44
(52) U.S. Cl. ...................................... 385/109
(58) Field of Search ................ 385/109, 100, 385/114, 115

(56) References Cited

U.S. PATENT DOCUMENTS

| 5,611,016 | A | | 3/1997 | Fangmann et al. ......... 385/100 |
|---|---|---|---|---|
| 5,729,966 | A | * | 3/1998 | Grulick ...................... 57/293 |
| 5,809,194 | A | * | 9/1998 | Lovie ......................... 385/104 |
| 5,930,431 | A | | 7/1999 | Lail et al. .................... 385/100 |
| 5,970,196 | A | | 10/1999 | Greveling et al. .......... 385/114 |
| 6,014,487 | A | | 1/2000 | Field et al. ................. 385/110 |

* cited by examiner

Primary Examiner—Javaid H. Nasri
(74) Attorney, Agent, or Firm—Timothy J. Aberle

(57) ABSTRACT

An optical fiber cable for use in a dispersion managed cable system including optical fibers. At least some of the optical fibers that exhibit a carefully controlled chromatic dispersion performance to support long distance, high data rate transmission. The optical fibers are contained within buffer tubes, at least some of the buffer tubes having at least one dispersion managed cable system (DMCS) identification marking thereon. The DMCS marked buffer tubes respectively contain at least one of the optical fibers having a carefully controlled chromatic dispersion performance to support long distance, high data rate transmission. The cable includes a cable jacket comprising at least one DMCS identification marking thereon.

16 Claims, 2 Drawing Sheets

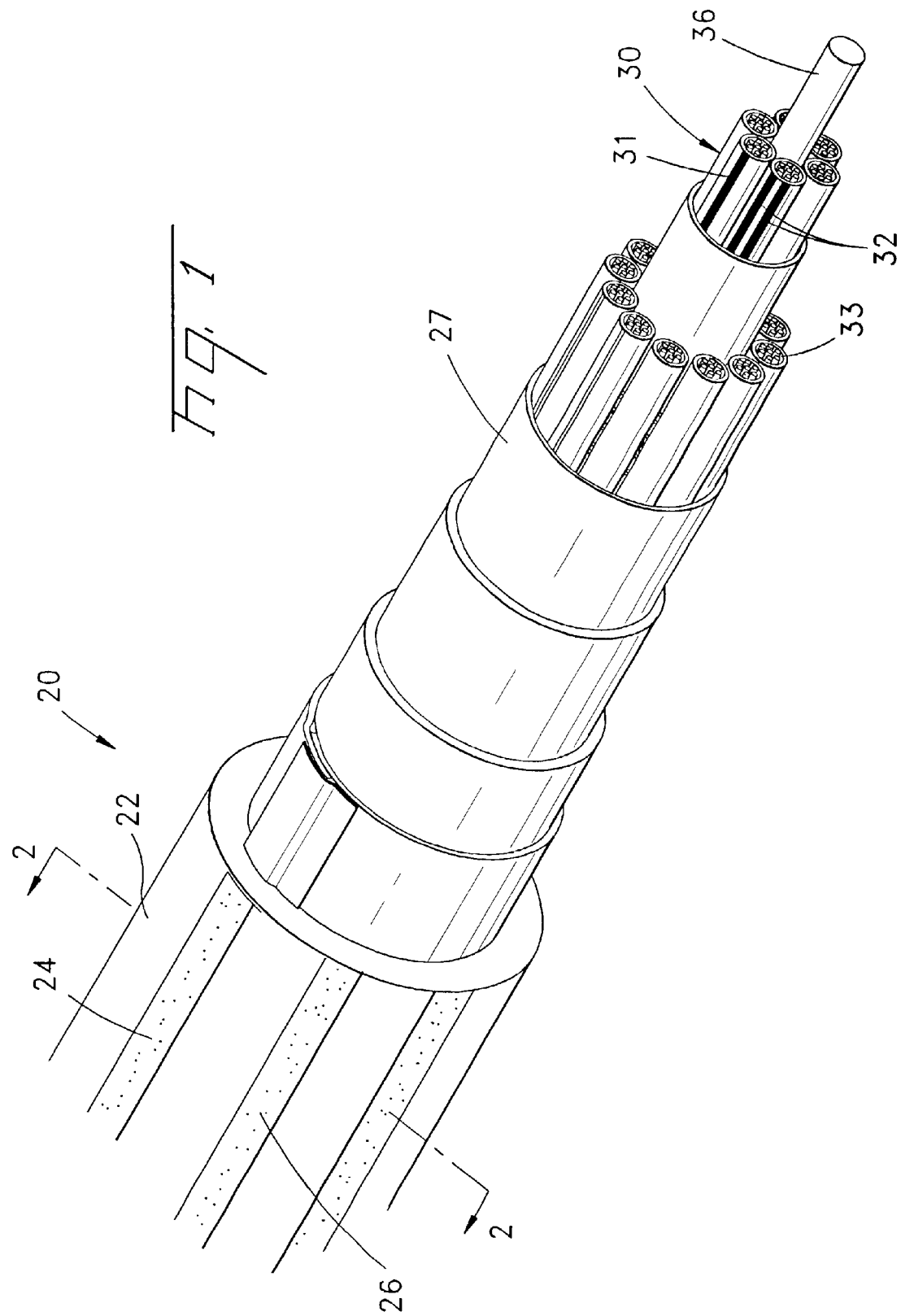

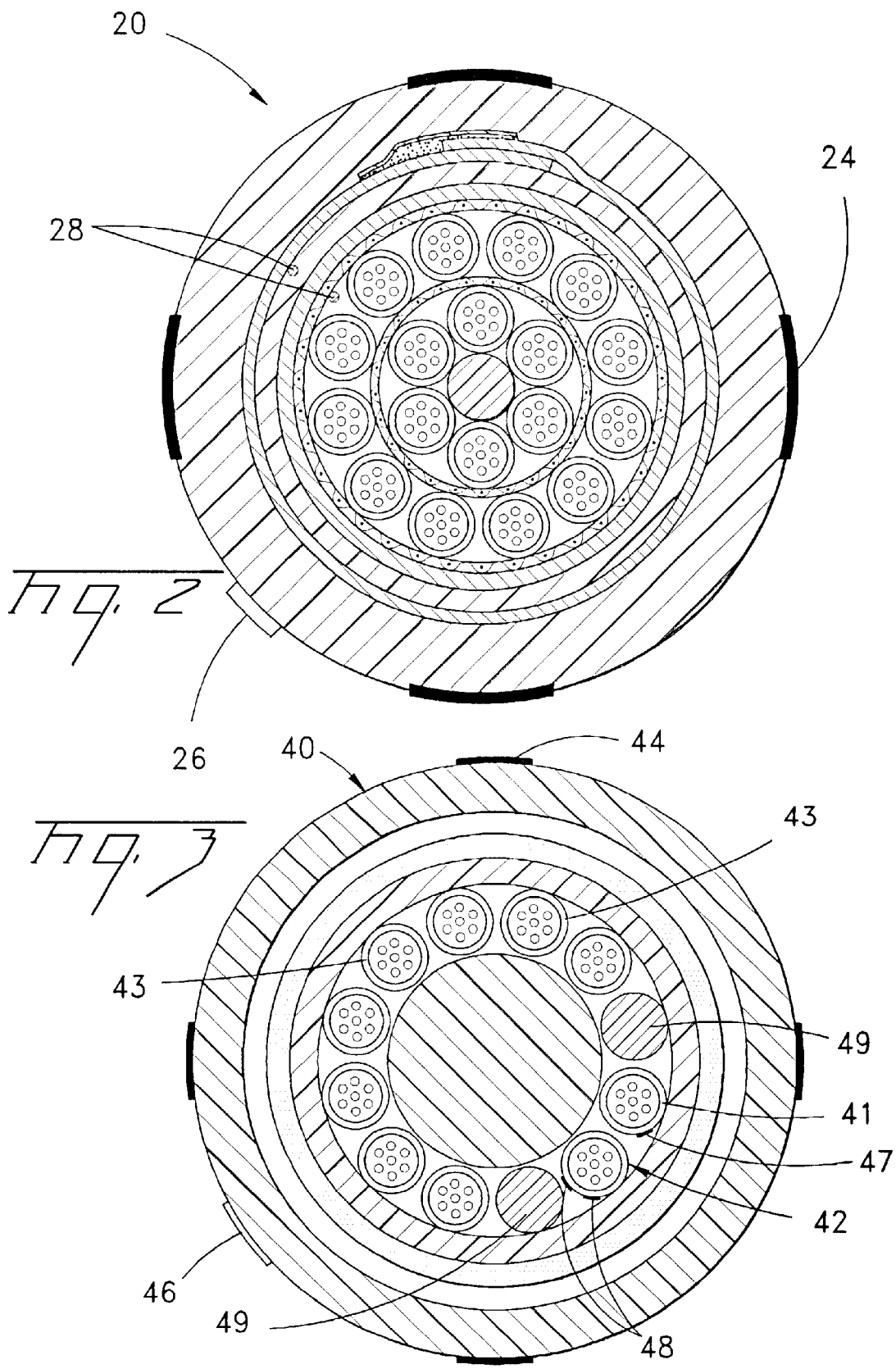

OPTICAL FIBER CABLE FOR USE IN A DISPERSION MANAGED CABLE SYSTEM

The present invention relates to the field of optical fiber cables, and, more particularly, to optical fiber cables containing optical fibers with chromatic dispersion characteristics designed to be incorporated in a dispersion managed telecommunications system intended for high data rate, long distance signal transmission.

BACKGROUND OF THE INVENTION

Optical fiber cables are used in telecommunication systems to transmit telephone, television, and computer data information in indoor and outdoor environments. The distance and data rate capabilities of these systems are directly affected by the chromatic dispersion performance of the optical fibers contained within the cables making up the system. From a technical perspective, the chromatic dispersion performance of each optical fiber is defined by the sum of the material dispersion and waveguide dispersion inherently present due to the material makeup and engineering design of the optical fiber. Material dispersion refers to the dispersion imposed upon a transmitted signal caused by the material composition of the medium through which it is traveling (silica glass is most commonly utilized in optical telecommunications). Changes in refractive index with wavelength give rise to a range of material dispersion values in a single optical fiber. In glass (silica) optical fibers, material dispersion increases with wavelength over a wavelength range of about 0.9 $\mu$m to 1.6 $\mu$m. The material dispersion attribute for an individual optical fiber can be characterized as "negative" or "positive" depending on the wavelength of the transmitted signal. Waveguide dispersion refers to the dispersion imposed upon a transmitted signal caused by the design and construction of the medium through which it is traveling. Doping is most commonly done by doping portions of the optical fiber with a specific material, commonly Germania, to create a specific index of refraction profile. The specific value of waveguide dispersion is also wavelength dependent and gives rise to a range of wavelength dispersion values in a single optical fiber. Waveguide and material dispersion effects are typically summed yielding an overall positive or negative chromatic dispersion characteristic in a given optical fiber.

An optical fiber cable design that incorporates chromatic dispersion affects is described in U.S. Pat. No. 5,611,016. The patent pertains to a dispersion-balanced optical cable for reducing four-photon mixing in Wave Division Multiplexing systems, the cable being designed to reduce cumulative dispersion to near zero. The dispersion-balanced optical cable requires positive and negative dispersion fibers in the same cable. Further, the positive dispersion aspect includes a dispersion characteristic defined as the average of the absolute magnitudes of the dispersions of the positive dispersion fibers exceeding a magnitude of 0.8 ps/nm·km at a source wavelength. In addition, the negative dispersion optical fiber characteristic requires the average of the absolute magnitudes of the dispersions of the negative dispersion to exceed a magnitude of 0.8 ps/nm·km at the source wavelength.

The aforementioned optical fibers are single-mode optical fibers designed for the transmission of optical signals in the 1550 nm wavelength region. At defined parameters, the positive-dispersion characteristic is +2.3 ps/nm·km and the negative-dispersion characteristic is −1.6 ps/nm·km. The aforementioned patent describes an optical ribbon including both positive and negative dispersion compensated optical fibers, enclosed within a mono-tube cable. A light-colored portion of the optical ribbon contains positive-dispersion optical fibers whereas a dark-colored portion of the optical ribbon contains negative-dispersion optical fibers. Two kinds of optical fibers are required in the same mono-tube.

Aspects of the Invention

An optical fiber cable for use in a dispersion managed cable system (DMCS) contains optical fibers that exhibit a carefully controlled chromatic dispersion performance to support long distance, high data rate transmission, and buffer tubes in the cable segregating groups of these optical fibers, at least some of the buffer tubes having at least one DMCS identification marking thereon and respectively containing at least one of the optical fibers having a carefully controlled chromatic dispersion performance to support long distance, high data rate transmission, the cable further including a protective outer cable jacket with at least one DMCS identification marking thereon.

In another aspect of the present invention, an optical fiber cable for use in a DMCS having optical fibers, at least some of the optical fibers having a carefully controlled chromatic dispersion performance to support long distance, high data rate transmission and buffer tubes segregating groups of optical fibers, at least some of the buffer tubes having at least one DMCS identification marking thereon and respectively containing at least one of the optical fibers having a carefully controlled chromatic dispersion performance to support long distance, high data rate transmission, the DMCS identification system of the present invention is not necessarily based on the convention of smallest to largest optical signal transmission zone. This zone is defined by the Mode Field Diameter (MFD) in single-mode optical fibers and the core diameter in multimode optical fibers. Rather, the DMCS identification system of the present invention has fibers arranged in the following order: DMCS optical fibers are first in the sequence order, then the remaining optical fiber types in order of increasing MFD/core diameter in subsequent respective buffer tubes. The buffer tubes are arranged such that DMCS identification marked buffer tubes with either positive or negative dispersion optical fibers are first in the sequence of buffer tubes contained in the cable, and buffer tubes containing non-DMCS optical fibers (if included) are arranged to follow the DMCS buffer tubes. If more than one type of non-DMCS optical fiber type is included the sequence order will be based upon increasing Mode Field Diameter/Core Diameter of the optical fibers contained in each buffer tube. In cables that require multi-layers of buffer tubes, the DMCS buffer tubes will preferentially be located in the innermost layer of buffer tubes.

In another aspect of the present invention, an optical fiber cable for use in a DMCS is defined having one or more layer(s) of buffer tubes and those buffer tubes arranged in a predetermined sequence for identification purposes. The first set of buffer tubes containing a first set of optical fibers with predetermined positive or negative chromatic dispersion characteristic respectively therein having a dispersion such that the range of absolute values of the chromatic dispersion is between about ten to about forty ps/nm.km; and a second set of buffer tubes containing other types of optical fibers having varying MFD/Core Diameters; the first and second sets of buffer tubes being separated by at least one interposed cable component.

BRIEF DESCRIPTION OF THE DRAWING FIGURES

FIG. 1 is an isometric view of an optical fiber cable according to the present invention.

FIG. 2 is a cross sectional view of the optical fiber cable of FIG. 1 taken along line 2—2.

FIG. 3 is a cross-sectional view of another embodiment of the present invention.

DETAILED DESCRIPTION OF THE INVENTION

Referring to FIGS. 1–3, optical fiber cables 20 and 40 for use in a dispersion managed cable system (DMCS) according to embodiments of the present invention will be described. Optical fiber cables according to the present invention can include a single optical fiber type or they can define a hybrid design containing at least two different optical fiber types. Generally the cables of the present invention include silica-based optical fibers, for example, that are made available by Corning Inc., and colored with UV curable inks. DMCS optical fibers used in the present invention have a carefully controlled chromatic dispersion performance to support long distance, high data rate transmission such that the range of absolute values of the chromatic dispersion is between about positive ten to about positive forty ps/nm·km. For example, the positive dispersion optical fibers have a dispersion of about ten to thirty ps/nm·km, and the negative dispersion optical fibers have a dispersion of about negative twenty to about negative forty ps/nm·km. Since the complexity of a DMCS system could easily create confusion during cable installation, splicing, and during emergency restorations, dispersion-managed cables according to the present inventions include a virtually mistake-proof identification system.

In an aspect of the present invention, optical fiber cable 20 includes a universally recognized, quick-to-spot, DMCS cable identification system for alerting a craftsman that the cable is a component of a DMCS. In one embodiment, optical fiber cable 20 includes a thermoplastic jacket 22 with four colored stripes 24, the colored stripes having a contrasting color with respect to the color of jacket 22 (FIGS. 1 and 2). Stripes 24 are preferably longitudinal, continuous, and co-extruded thermoplastic. Four stripes, preferably disposed at about 90° intervals, guarantees that the stripes will be noticed by the craftsman irrespective of the radial orientation of cable 20. Stripe colors can be used to identify the type of DMCS optical fiber contained in the cable. For example, the DMCS identification system can include: four blue stripes indicating the cable contains positive dispersion fibers; four green stripes indicating the cable contains negative dispersion fibers; or four stripes of a designated alternate color indicating the cable is a hybrid DMCS mixture of both DMCS optical fiber types. That is, for hybrid DMCS mixture cables, the cable includes both positive and negative dispersion fibers. Cables containing only one type of DMCS optical fiber may contain only DMCS optical fibers or be in combination with non-DMCS fibers, for example, LEAF®, SMF-28®, MetroCor™, or InfiniCor® optical fibers made available by Corning Inc. The distinctive factor for these cables is that they contain only one type of DMCS optical fiber and the stripe color is indicative of that DMCS optical fiber type. Markings indicating a hybrid DMCS mixture will alert the technician that the cable construction is complex, and a thorough investigation of its construction must be made before, for example, optical fiber routing and/or splicing should begin.

In another aspect of the present inventions, the DMCS identification system can include a print string 26. Print string 26 can contain a character set unique to the cable that can be used as an input to a database containing cable data including optical performance characteristics and construction specifications. In a preferred embodiment, cable data is stored in connection with certain cable characteristics. In addition to or in lieu of the foregoing, the print string can include a World Wide Web site address, accessible by, e.g., the customer or cable installer, whereby the customer or installer can interactively interface with the cable characteristics database, for example, for testing or installation instructions or details.

Also, print string 26 can include fiber type and counts corresponding to the sequence order of the buffer tubes in the cable, e.g., "36F +D/24F LEAF/24F SM", meaning thirty six positive dispersion optical fibers, twenty four LEAF® optical fibers, and twenty four dispersion-unshifted single-mode optical fibers. In addition, a manufacturer's or customer's name or other required information can be included. The DMCS identification system can include wrap around cable identification tags containing pertinent information. These tags would preferably be disposed at, for example, splice points, slack points, and/or transition points.

In an another aspect of the present invention, cable 20 can include a layer of buffer tubes 30 having at least one DMCS identification system feature for quickly identifying the fiber types contained within them (FIG. 1). Preferably, the tubes are formed of polybutyleneterephthalate (PBT), but can be formed of other suitable materials. The cable of FIG. 1 is shown for illustration purposes and can include more or less buffer tubes 30 according to the present invention. The DMCS identification system of the present invention is not necessarily based on the convention of smallest to largest optical signal transmission zone. This is defined by the Mode Field Diameter (MFD) in single-mode optical fibers and the core diameter in multimode optical fibers. Rather, the DMCS identification system of the present invention has fibers arranged in the following order: DMCS optical fibers are first in the sequence order, then the remaining fiber types in order of increasing MFD/core diameter in subsequent respective buffer tubes. For example: positive dispersion optical fibers are disposed in a group including at least one tube 31, then the remaining fiber types in order of increasing MFD/core diameter are disposed in a group including remaining tubes 33. Each group can contain more than one buffer tube containing respective optical fibers. Where the cable includes two or more layers of buffer tubes the DMCS fibers are preferably in the inner layer. In those cases where a hybrid DMCS mixture of both DMCS optical fiber types is required, DMCS buffer tubes 31 and 32 with dispersion managed fibers will be in the first and second in the sequence of positioning buffer tube order in the cable. Preferably, the buffer tubes containing the positive dispersion DMCS optical fibers will be first in the sequence and followed by the buffer tubes containing negative dispersion DMCS optical fibers. A filler rod may be interposed at the transition point between the last buffer tube containing positive DMCS optical fibers and the first buffer tube containing negative DMCS optical fibers to further enhance identification within the cable.

The buffer tubes containing DMCS optical fibers will have a unique physical appearance which easily differentiate them from buffer tubes containing non-DMCS optical fibers. Buffer tubes containing DMCS optical fibers occupying buffer tube positions 1 through 12 will be opaque, semi-transparent or translucent thermoplastic. The number of stripes on the buffer tubes would identify DMCS optical fiber type. For example, one stripe on a respective buffer tube indicates positive dispersion optical fibers, and two stripes on a respective buffer tube indicates negative dispersion optical fibers. The color of the stripes change with each tube, thereby providing unique identification of each tube position. The color scheme can follow the color identification scheme set forth by Telecommunications Industry Association/Electronic Industries Association standards document entitled "Optical Fiber Cable Color Coding" (TIA/EIA-598). For example, exemplary cable 20 can include twelve positive dispersion optical fibers in opaque buffer tube 31 with one blue stripe, twelve negative dispersion optical fibers in opaque buffer tube 32 with two orange stripes, and then other optical fiber types in colored tubes 33, for example, non-zero dispersion-shifted single-mode optical fibers, dispersion-unshifted single-mode optical fibers, and/or multimode optical fibers. The preferred method of defining the stripes of DMCS tubes 31 and 32 is by co-extrusion defining a stripe-width, for example, of about 2.5 mm. In a preferred embodiment, the DMCS cable has an optical fiber count of about 144 optical fibers or less. If the cable includes more than twelve buffer tubes (>144 fibers), buffer tube number thirteen and higher containing DMCS optical fibers can be uniquely identified from the first twelve positions by utilization of a base tube color that is neither translucent nor utilized in the standard color sequence of TIA/EIA-598. As an additional option, individual buffer tubes may be marked with a printed statement that further clarifies the identification of a particular buffer tube. Alternatively, non-standard colors can be used, e.g., tan, instead of opaque but with stripes as described.

In the embodiment of FIG. 3, as in the embodiment of FIGS. 1–2, the DMCS identification system of optical fiber cable 40 can include cable jacket stripes 44 and a print string 46. A single layer or multiple layers of buffer tubes surround a dielectric or metallic central member and includes buffer tubes 41 and 42 containing optical fibers with positive or negative dispersion optical fibers respectively therein having a carefully controlled chromatic dispersion performance to support long distance, high data rate transmission. Buffer tube 41 can include positive dispersion optical fibers and a single stripe 47, and buffer tube 42 can include negative dispersion optical fibers and two stripes 48. Remaining tubes 43 can include colored plastic tubes, e.g., standard colors and other types of optical fibers therein for example, LEAF®, SMF-28™, MetroCor™, or InfiniCor®. Buffer tubes 41 and 42 can be separated from tubes 43 by one or more interposed cable components, for example, filler rods 49. Filler rods can be interposed between the groups containing the positive and negative dispersion, and remaining, optical fiber types. Another option is to print characters on the buffer tubes with, for example, a dot matrix or laser printer indicating "POSITIVE DISPERSION FIBER" or "POS", "NEGATIVE DISPERSION FIBER" or "NEG", "LEAF", "SMF28", etc. Further, the DMCS identification system can include an identifying tape (not shown), placed within the cable, that contains printed information pertaining to the cable.

A further embodiment of a DMCS identification system includes a completely colored, e.g., non-black, cable jacket. For example, a blue jacket for a cable that only contains positive dispersion optical fibers. In addition to cable jacket information, print string data 36 could be located on a central member.

The present invention has thus been described with reference to the foregoing embodiments, and are intended to be illustrative of the inventive concept rather than limiting. Persons of skill in the art will appreciate that variations and modifications of the foregoing embodiments may be made without departing from the scope of the appended claims. In the exemplary embodiment described, the optical fiber cable can include ripcords 28, tapes, water-blocking components, armor, a central anti-buckling member, buffer tube filling compounds, core binders, and/or other cable components disclosed in U.S. Pat. Nos. 5,930,431, 5,970,196, or 6,014,487, which are respectively incorporated by reference herein. As an alternative to extruded stripes, printed stripes, formed by laser marking or ink jet printing, can be used. Although the DMCS identification system of the present invention has positive dispersion fibers in a first group of buffer tubes, negative dispersion fibers in a second group of buffer tubes, then the remaining fiber types in order of increasing MFD in respective buffer tubes, other arrangements are possible.

Accordingly, what is claimed is:

1. An optical fiber cable for use in a dispersion managed cable system (DMCS), comprising:
   optical fibers, at least some of the optical fibers exhibit a carefully controlled chromatic dispersion performance to support long distance, high data rate transmission, and buffer tubes containing the optical fibers, at least some of the buffer tubes having at least one DMCS identification marking thereon and respectively containing at least one of the optical fibers having a carefully controlled chromatic dispersion performance to support long distance, high data rate transmission; and a cable jacket, the cable jacket comprising at least one DMCS identification marking thereon.

2. The optical fiber cable of claims 1, at least some of the buffer tubes not including a DMCS identification marking thereon.

3. The optical fiber cable of claims 1, the buffer tubes having a DMCS identification marking comprising stripes or printing of characters on a surface of the buffer tubes.

4. The optical fiber cable of claims 1, the cable jacket DMCS identification marking comprising stripe(s) or print string associated with a surface of the cable jacket.

5. The optical fiber cable of claims 4, the DMCS print string comprising a World Wide Web address.

6. The optical fiber cable of claims 4, the print string being made on a surface of the jacket or a cable identification tag.

7. The optical fiber cable of claims 4, the cable jacket DMCS identification marking comprising at least four colored stripes formed on a surface of the cable jacket annularly spaced at about 90° intervals.

8. The optical fiber cable of claim 1, the sequence of the buffer tubes being arranged such that DMCS identification marked buffer tubes occupy the first positions within the cable core in the innermost layer.

9. The optical fiber cable of claim 8, the buffer tubes containing DMCS optical fibers that are intended to occupy buffer tube positions 1 through 12 are formed of an opaque, semi-transparent or translucent thermoplastic.

10. The optical fiber cable of claim 8, the buffer tubes containing DMCS optical fibers that are intended to occupy buffer tube positions above 12 are formed of a colored thermoplastic which is unique from those colors used in the color code defined by TIA/EIA-598.

11. The fiber optic cable of claim 3, the DMCS buffer tube includes at least one colored stripe.

12. The fiber optic cable of claim 4, the DMCS marking being colored.

13. The fiber optic cable of claim 1, the cable containing a mixture of DMCS fibers and non-DMCS fibers, and at least one cable component being interposed between buffer tubes containing different fiber types.

14. The fiber optic cable of claim 1, said cable incorporating both positive and negative DMCS fiber types, the positive dispersion optical fibers are first in the buffer tube sequence and the negative dispersion optical fibers are second in the buffer tube sequence, buffer tubes containing non-DMCS optical fiber types are placed in sequence following the buffer tubes containing DMCS optical fibers and are arranged in order of increasing Mode Field Diameter/Core Diameter.

15. An optical fiber cable for use in a dispersion managed cable system, comprising:

optical fibers, at least some of the optical fibers exhibit a carefully controlled chromatic dispersion performance to support long distance, high data rate transmission;

buffer tubes containing the optical fibers, at least some of the buffer tubes having at least one DMCS identification marking thereon and containing the optical fibers having a carefully controlled chromatic dispersion performance to support long distance, high data rate transmission, the buffer tubes being arranged such that DMCS identification marked buffer tubes with positive or negative dispersion optical fibers are grouped therein, and buffer tubes containing remaining fiber types are arranged in order of increasing Mode Field Diameter; and a cable jacket, the cable jacket comprising at least one DMCS identification marking thereon.

16. The optical fiber cable of claim 15, said positive dispersion fibers being in a first position of a first group, and negative dispersion fibers being in at least one buffer tube of a second group.

* * * * *